United States Patent
Glasson

(12) 
(10) Patent No.: US 6,411,082 B2
(45) Date of Patent: Jun. 25, 2002

(54) MULTI-TURN, NON-CONTACTING ROTARY SHAFT POSITION SENSOR

(75) Inventor: Richard O. Glasson, Whippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 0 days.

(21) Appl. No.: 09/785,097

(22) Filed: Feb. 16, 2001

Related U.S. Application Data

(60) Provisional application No. 60/183,270, filed on Feb. 17, 2000.

(51) Int. Cl.[7] .............................. G01B 7/30; G01B 7/14
(52) U.S. Cl. .............................. 324/207.25; 324/207.2; 324/207.21; 324/207.24
(58) Field of Search ........................ 324/207.15–207.26, 324/252, 260, 262; 338/32 R, 32 H; 340/686, 870.33

(56) References Cited

U.S. PATENT DOCUMENTS

| | | |
|---|---|---|
| 3,403,365 A | 9/1968 | Richards |
| 3,777,273 A | 12/1973 | Baba et al. |
| 3,988,710 A | 10/1976 | Sidor et al. |
| 4,057,904 A | 11/1977 | Vrable et al. |
| 4,121,504 A | 10/1978 | Nowak |
| 4,214,180 A | 7/1980 | Kuwako et al. |
| 4,286,386 A | 9/1981 | Long |
| 4,319,864 A | 3/1982 | Kaufeldt |
| 4,356,557 A | 10/1982 | Bell et al. |
| 4,367,998 A | 1/1983 | Causer |
| 4,386,552 A | 6/1983 | Foxwell |
| 4,425,557 A | 1/1984 | Nakamura |
| 4,653,190 A | 3/1987 | Spain, Jr. |
| 4,914,389 A | 4/1990 | Juds |
| 4,945,221 A | 7/1990 | Nielsen et al. |
| 4,989,329 A | 2/1991 | Pullen |
| 5,024,250 A | 6/1991 | Nakamura |
| 5,200,747 A | 4/1993 | Betz et al. |
| 5,444,369 A | 8/1995 | Luetzow |
| 5,649,042 A | 7/1997 | Eaton et al. |
| 5,752,811 A | 5/1998 | Petro |
| 5,757,179 A | 5/1998 | McCurley et al. |
| 5,768,946 A | 6/1998 | Fromer et al. |
| 5,789,917 A | 8/1998 | Oudet et al. |
| 5,955,881 A | 9/1999 | White et al. |
| 6,160,395 A | 12/2000 | Goetz et al. |

FOREIGN PATENT DOCUMENTS

| | | |
|---|---|---|
| DE | 19908036 | 8/2000 |
| EP | 0896855 | 2/1999 |
| JP | 11211410 | 8/1999 |

Primary Examiner—Jay Patidar

(57) ABSTRACT

A multi-turn non-contacting rotary shaft position sensor that determines a positional parameter of a rotating shaft. The sensor converts the rotational movement of an input shaft to a linear translational movement of a magnetic element. A magnetically sensitive sensor is provided in a fixed location in close proximity to the magnetic element within the flux field of that magnetic element. As the input shaft rotates, the magnetic element moves along that linear path toward or away from the magnetically sensitive sensor so that the sensor detects the change in the magnetic flux imposed by the magnetic element. That change in magnetic flux is used to determining a positional parameter of the input shaft.

25 Claims, 1 Drawing Sheet

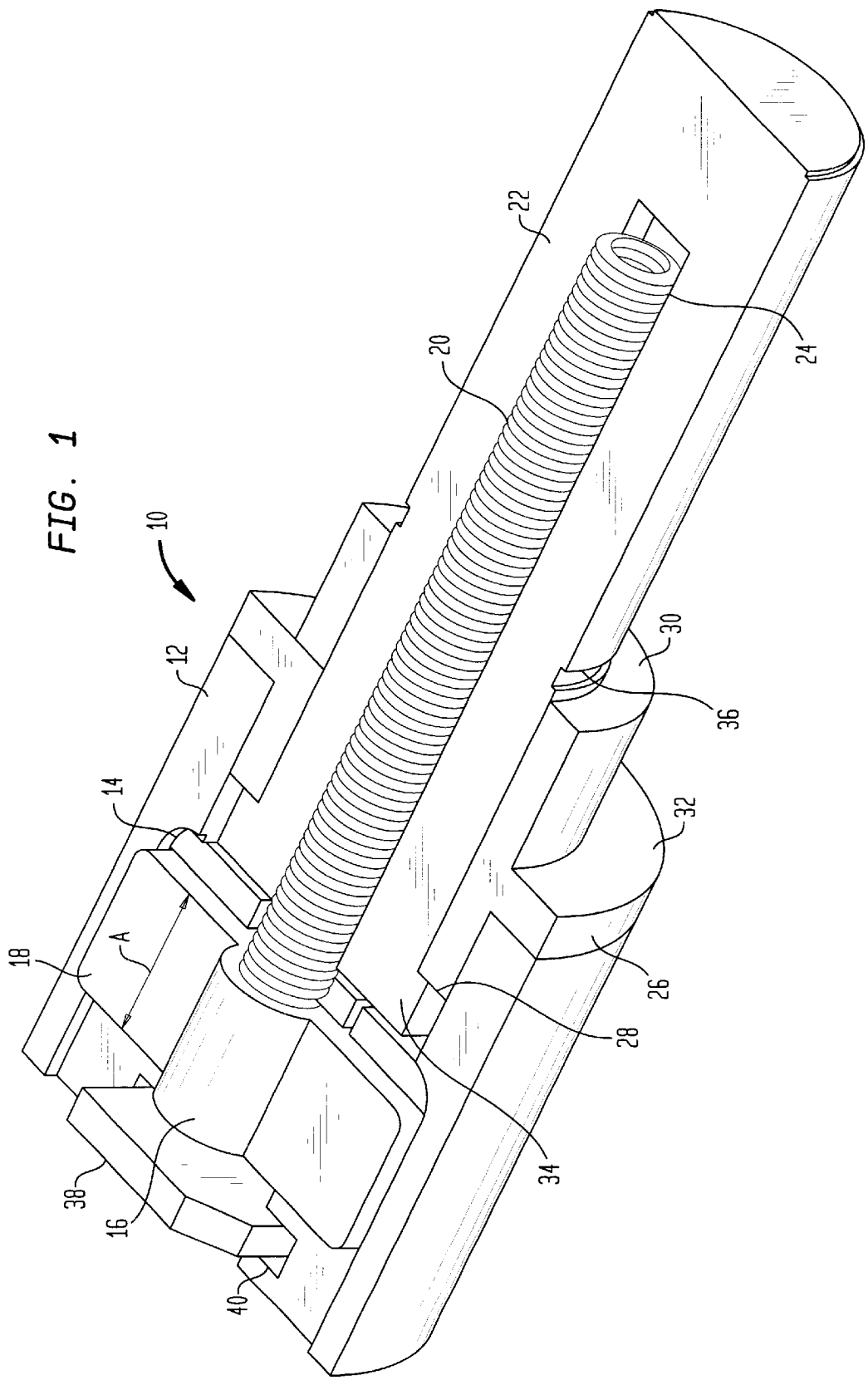

MULTI-TURN, NON-CONTACTING ROTARY SHAFT POSITION SENSOR

RELATED APPLICATIONS

The present application is based upon and claims the benefit of U.S. Provisional Application Ser. No. 60/183,270 filed Feb. 17, 2000.

FIELD OF THE INVENTION

The invention generally relates to position sensors, and more particularly, to a magnetically sensitive sensor that detects a positional parameter of a rotating element.

BACKGROUND

Rotary sensors using contacting technology, such as potentiometers, suffer from various disadvantages that have limited their use. In applications requiring prolonged use over many years or requiring many cycles, the contacting sensors develop dead zones and non-uniform electrical behavior. Additionally, contacting sensors, even when in good condition, exhibit a relatively high degree of electrical noise during operation. This noise is a problem in sensitive electronic circuits.

It has been suggested to use non-contacting angular sensors to overcome the disadvantages of contacting sensors. Such sensors are not as susceptible to wear and exhibit reduced electrical noise. One barrier to the widespread use of non-contacting transducers, however, is the restricted angular range of those devices. Examples of such devices are shown in the U.S. Pat. Nos. 3,777,273; 3,988,710; 4,425,557 and 5,789,917. All of these devices have an angular operating range of less than one-half turn.

Another barrier to the widespread use of non-contacting sensors is the use of magnetic devices in such sensors. Magnetic fields are short acting, thus magnetic sensors have limited range and they exhibit undesirable signal-to-noise ratios (SNR) due to outside magnetic disturbances. The problems with non-linearity and SNR have been somewhat offset by the use of pole pieces, or flux directors. Flux directors attempt to extend the usable linear range of a magnetic field by advantageously shaping the field. The need to improve the SNR has been cited in various publications, including U.S. Pat. Nos. 5,444,369; 5,789,917; and 5,757,179.

There are contacting rotary sensors that exhibit extended range, but these sensors suffer from the disadvantages discussed above and are generally too complex and too costly for commercial acceptance. Moreover, these multi-turn sensors provide only a relative position indication, having no absolute reference.

SUMMARY OF THE INVENTION

The advantages of magnetic, non-contacting sensors over contacting potentiometric types include virtually unlimited operating life, owing to the fact that there are no physical contacts. Non-contacting sensors according to the principles of the invention do not suffer from the wear degradation and electrical noise exhibited by contacting sensors. A sensor according to the principles of the invention also offers a useful range of many full revolutions. Such a range makes the present invention a suitable replacement for absolute rotary encoders, angular sensors, potentiometers, tuners, and robotic joint sensors. A sensor according to the principles of the invention reduces SNR by converting a relatively large rotational mechanical input to a smaller linear mechanical translation of the magnet in the measurement circuit. This technique allows the sensor to use a very small portion of the magnetic field that is close to the magnet. This field portion offers the highest magnetic flux density for a given magnet and thus results in improved SNR. Also, the small size of this field portion reduces dependence on linearity.

BRIEF DESCRIPTION OF THE DRAWING

A more complete understanding of the invention may be obtained from consideration of the following description in conjunction with the drawing in which:

The FIGURE is a perspective view, partially cut away, showing the rotary shaft position sensor constructed in accordance with the present invention.

DETAILED DESCRIPTION

Referring to FIG. 1, there is shown a perspective view, partially cut away, of a rotary shaft position sensor 10 constructed in accordance with the present invention. As can be seen, there is a housing 12 that may be of any variety of materials, such as metals or plastic compositions. Within the housing 12, there is formed a specially configured pocket 14 within which is located a magnetic element 16. The magnetic element 16 may be a permanent magnetic that emits a magnetic flux therefrom and the purpose of the magnetic field flux will be later appreciated. The exterior portion 18 of the magnetic element 16 is also specially configured, and as shown, that exterior portion 18 may be formed in a prismatic shape, it being of importance that the exterior portion 18 of the magnetic element 16 be specially configured so as to fit with the pocket 14 such that the magnetic element 16 is prevented from rotating with respect to housing 12 but can move along a linear path within the housing 12 indicated by the arrow A.

Extending outwardly from the magnetic element 16 is threaded shaft 20, shown as externally threaded and the threaded shaft 20 extends external of the housing 12. The threaded shaft 20 may be a separately formed part that is inserted into the magnetic element 16 or insert molded in the production of the magnetic element 16, however, in any event, the threaded shaft 20 is firmly affixed to that magnetic element 16.

An input shaft 22 is threadedly affixed to the threaded shaft 20 external of the housing 12 by means of internal threads 24. Thus, the input shaft 22 and the threaded shaft 20 are threadedly engaged together and, as stated, in the preferred embodiment, the threaded shaft 20 has external threads and the input shaft 22 has internal threads 24. The threaded shaft 20 and the input shaft 22 are threadedly engaged together and, as can be seen, the external and internal locations of the respective threads on each of those components could readily be reversed and the rotary shaft position sensor 10 still function in the manner to be explained.

The input shaft 22 is rotatable affixed to the housing 12 such that the input shaft 22 can freely rotate with respect to the housing 12 but is restrained from any axial movement with respect thereto. In the Figure, the mounting of the input shaft 22 is accomplished by means of a mounting bushing 26 that is fitted to the housing 12 and that mounting bushing 26 has an inner end 28, an outer end 30 and an exterior flange 32 that seats against the housing 12. Mounting bushing 26 thus surrounds the input shaft 22 and provides a seal against the input shaft 22 while allowing the input shaft 22 to freely rotate within the mounting bushing 26.

To prevent the input shaft 22 from moving axially with respect to the housing 12, there is formed an inner flange 34 at the inner end of the input shaft 22 and which rotatably engages the inner end 28 of the mounting bushing 26 to prevent the input shaft 22 from moving axially outwardly from the housing 12. A further device, such as a C-clip, not shown, can be inserted into a groove 36 formed in the input shaft 22 just proximate the outer end 30 of the mounting bushing 26 such that the axial movement of the input shaft 22 toward the housing 12 is also prevented, thus restraining the input shaft 22 with respect to the housing 12 along either axial direction while, at the same time, allowing the input shaft 22 to freely rotate within the housing 12.

A magnetically sensitive sensor 38 is mounted proximate the magnetic element 16 and that mounting is preferably by means of a recess 40 that is formed in the housing 12 and into which the sensor 38 is fitted, thus retaining that sensor 38 firmly in a fixed position with respect to the housing 12 so that the finite distance between the magnetically sensitive sensor 38 and the magnetic element 16 is affected only by the movement of the magnetic element 16. As can be noted, however, it is important that the magnetically sensitive sensor 38 be positioned within the magnetic field of the magnetic element 16 and the precise finite distance from that magnetic element 16 is dependent, of course, on the strength of the magnetic field of that magnetic element 16.

The actual magnetically sensitive sensor 38 may be of a variety of sensors provided that such sensors are capable of detecting the changing magnetic field of the magnetic element 16 as the distance between the magnetic element 16 and the sensor changes. Typical of such magnetically sensitive sensors is a Hall Effect sensor or a Giant Magneto Resistive (GMR) sensor, however other sensors sensitive to magnetic flux may be used consistent with the principles of the invention.

Accordingly, with the elements of the present invention described, the operation of the rotary shaft position sensor 10 can be described. As the input shaft 22 is rotated, that rotation causes the magnetic element 16 to translate in the direction along the axis of the threaded shaft 20 and thus the magnetic element 16 moves axially within the housing 12 dependent upon the amount of angular rotation of the input shaft 22. The amount of such translational movement per angular rotation of the input shaft 22 is, of course, dependent upon the threads per inch, thread pitch or other parameter of the threaded interengagement between the input shaft 22 and the threaded shaft 20 of the magnetic element 16. In the design of a particular rotating shaft position sensor 10, therefore, the amount of linear translation of the magnetic element 16 per the amount of angular rotation of the input shaft 22 can be designed in accordance with the particular rotation of the input shaft 22 depending upon the particular use of the device such that the use of the rotary shaft position sensor 10 is applicable to a wide variety of differing applications.

In any event, as the input shaft 22 is rotated, the magnet element 16 is linearly translated by the interengement of the threaded shaft 20 and the internal threads 24 of the input shaft 22 to change the distance between that magnetic 16 and the magnetically sensitive sensor 38 such that the effect of the magnetic flux field on sensor 38 changes in proportion thereto and that change in magnetic field can be measured in order to determine the rotation of the input shaft 22.

It should be noted here that the rotation of the input shaft 22 being measured by this invention is not limited to a 90, 180 or even 360 degree rotation of the input shaft 22 but may be applicable readily to multiple full rotations of the input shaft 22.

As indicated, the magnetically sensitive sensor 38 experiences the change in the magnetic field flux radiated by the magnet element 16 and the sensor itself may be any one of a variety of sensors, among such typical sensors is a Linear Hall Effect sensor where the sensor produces an electrical change in a voltage signal analogous to the angular position of the input shaft 22, or, alternatively, the sensor 38 may be a Giant Magneto Resistive (GMR) sensor that experiences a change in internal resistance responsive to the change in the magnetic field and, in such case, that change of resistance can be measured and which is also analogous to the angular position of the input shaft 22. Other sensors may also be utilized as long as the particular sensor is sensitive to a changing of the magnetic flux field emitted by the magnetic element 16. In this way, a varying magnetic influence is imposed upon the magnetically sensitive sensor, the magnetic influence being dependent on the angular position of the input shaft.

As can now be seen, the rotary shaft position sensor 10 according to the principles of the invention can be used to detect and measure various parameters of the rotational movement of the input shaft 22 including, but not limited to, the angular position of that input shaft 22, the amount of rotation of the input shaft 22 and even the angular velocity of the rotation by means of the sensing and interpretation of the changing effect of the magnetic field upon the magnetically sensitive sensor 38. The present invention can even be used to determine the direction of rotation of the input shaft 22, that is, whether it is moving in the clockwise or counterclockwise directions by determining whether the influence of the magnetic flux is increasing or decreasing upon the magnetically sensitive sensor 38.

It is to be understood that the invention is not limited to the illustrated and described forms of the invention contained herein. It will be apparent to those skilled in the art that various changes may be made without departing from the scope of the invention and the invention is not considered limited to what is shown in the drawing and described in the specification.

What is claimed is:

1. A rotary shaft position sensor comprising:
   a housing;
   a magnetic element producing a magnetic field and located within said housing, said magnetic element adapted to be translatable along a linear path within said housing but constrained from rotational movement;
   said magnetic element having a threaded shaft extending therefrom;
   a rotatable input shaft threadedly affixed to said threaded shaft, said rotatable input shaft adapted to be rotated to translate said magnetic element along said linear path within said housing, and
   a sensor positioned in proximity to said magnetic element and within said magnetic field, wherein said linear movement of said magnetic element causes a change in the magnetic influence of said magnetic field on said sensor.

2. A rotary shaft position sensor as defined in claim 1 wherein said sensor is a Linear Hall Effect sensor.

3. A rotary shaft position sensor as defined in claim 1 wherein said sensor is a Giant Magneto Resistive sensor.

4. A rotary shaft position sensor as defined in claim 1 wherein said magnetic element is a permanent magnet.

5. A rotary shaft position sensor as defined in claim 1 wherein said threaded shaft has external threads and said input shaft has internal threads.

6. A rotary shaft position sensor comprising:
   a housing;
   a magnetic element producing a magnetic field and located within said housing,
   means to affix said magnetic element to said housing to allow said magnetic element to move along a linear path but to prevent said magnetic element from rotating with respect to said housing;

said magnetic element having a threaded shaft extending therefrom, said threaded shaft extending outwardly from said housing a rotatable input shaft threadedly affixed to said threaded shaft, said rotatable input shaft adapted to be rotated to translate said magnetic element along said linear path within said housing, and a magnetically sensitive sensor;

means to mount said magnetically sensitive sensor within said housing in proximity to said magnetic element and within said magnetic field, wherein said linear movement of said magnetic element causes a change in the magnetic influence of said magnetic field on said sensor.

7. A rotary shaft position sensor as defined in claim 6 wherein said means to mount said magnetically sensitive sensor comprises a recess formed in said housing, said magnetically sensitive sensor configured to be fitted within said recess.

8. A rotary shaft position sensor as defined in claim 6 wherein said housing has a pocket formed therein and wherein said magnetic element has a specially configured outer portion and said means to affix said magnetic element to said housing comprises interfitting said magnetic element into said pocket.

9. A rotary shaft position sensor as defined in claim 8 wherein specially configured outer portion of said magnetic element is a prismatic shape.

10. A rotary shaft position sensor as defined in claim 6 wherein said threaded shaft has external threads and said input shaft has internal threads.

11. A rotary shaft position sensor as defined in claim 6 wherein said magnetic element is a permanent magnet.

12. An instrument for determining a positional parameter of a rotatable shaft, said instrument comprising;

a housing;

a magnetic element producing a magnetic field and located within said housing, said magnetic element adapted to be translatable along a linear path within said housing but constrained from rotational movement;

said magnetic element having a threaded shaft extending therefrom;

a rotatable input shaft threadedly affixed to said threaded shaft, said rotatable input shaft adapted to be rotated to translate said magnetic element along said linear path within said housing, a sensor positioned in close proximity to said magnetic element and within said magnetic field, wherein said linear movement of said magnetic element causes a change in the magnetic influence of said magnetic field on said sensor; and means to derive a signal based upon said change in the magnetic influence sensed by said sensor to determine a positional parameter of said input shaft.

13. An instrument as defined in claim 12 wherein said rotational parameter is the rotational travel of said input shaft.

14. An instrument as defined in claim 12 wherein said rotational parameter is the angular position of said input shaft.

15. An instrument as defined in claim 12 wherein said rotational parameter is the angular speed of said input shaft.

16. An instrument as defined in claim 12 wherein said means to derive a signal comprises a means of determining a change in resistance of said sensor based on said change in the magnetic influence.

17. An instrument as defined in claim 12 where said means to derive a signal comprises a means of sensing an electrical signal from said sensor.

18. A method of detecting a positional parameter of a rotatable shaft, said method comprising the steps of:

providing a housing, providing a magnetic element within the housing emitting a magnetic field and having a shaft extending therefrom, providing a magnetically sensitive sensor in a fixed position within the housing within the magnetic field of the magnetic element, allowing the magnetic element to move along a linear path with the housing while constraining the magnetic element for rotational movement, providing a input shaft threadedly engaged to the shaft, and rotating the input shaft to translate the magnetic element to move the magnetic element along the linear path toward and away from the magnetically sensitive sensor to change the effect of the magnetic field on the sensor.

19. A method of detecting a positional parameter of a rotatable shaft as defined in claim 18 wherein said step of providing a magnetic element comprises providing a permanent magnet.

20. A method of detecting a positional parameter of a rotatable shaft as defined in claim 18 wherein said step of providing a magnetically sensitive sensor in a fixed position comprises locating the sensor in a recess formed in the housing.

21. A rotary shaft position sensor comprising:

a housing;

a magnetic element producing a magnetic field and located within said housing, said magnetic element adapted to be translatable along a linear path within said housing but constrained from rotational movement;

said magnetic element having an shaft extending therefrom;

a rotatable input shaft operatively interconnected to said magnetic element shaft, said rotatable input shaft adapted to be rotated to translate said magnetic element along said linear path within said housing, and a sensor positioned in proximity to said magnetic element and within said magnetic field, wherein said linear movement of said magnetic element causes a change in the magnetic influence of said magnetic field on said sensor.

22. A rotary shaft position sensor as defined in claim 21 wherein said operative interconnection between said magnetic element shaft and said rotatable input shaft comprises a threaded interengagement.

23. A rotary shaft position sensor as defined in claim 21 wherein said magnetic element shaft has external threads and said rotatable input shaft has internal threads.

24. A rotary shaft position sensor as defined in claim 21 wherein said sensor produces an electrical signal dependent upon the influence of the magnetic field on said sensor.

25. A rotary shaft position sensor as defined in claim 21 wherein said sensor changes its internal resistance dependent upon the influence of the magnetic field on said sensor.

* * * * *

UNITED STATES PATENT AND TRADEMARK OFFICE
CERTIFICATE OF CORRECTION

PATENT NO. : 6,411,082 B2
DATED : June 25, 2002
INVENTOR(S) : Richard O. Glasson It is certified that error appears in the above-identified patent and that said Letters Patent is hereby corrected as shown below:

<u>Title page,</u>
Item [57], ABSTRACT,
Line 12, please change "determining" to read -- determine --;

<u>Column 2,</u>
Line 25, please change "permanent magnetic" to read -- permanent magnet --;

<u>Column 3,</u>
Lines 50-51, please change "magnet element" to read -- magnetic element --;
Line 53, please change "magnetic" to read -- magnetic element --;
Line 65, please change "magnet" to read -- magnetic --.

Signed and Sealed this

Twentieth Day of August, 2002

Attest:

JAMES E. ROGAN
*Attesting Officer*  *Director of the United States Patent and Trademark Office*